United States Patent
Kaasila et al.

(10) Patent No.: US 6,717,934 B1
(45) Date of Patent: Apr. 6, 2004

(54) WIRELESS TELECOMMUNICATION SYSTEM HAVING IMPROVED RECOGNITION OF MODULATION TYPE IN GPRS

(75) Inventors: Pekka Kaasila, Oulu (FI); Risto Paatelma, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/425,712

(22) Filed: Oct. 22, 1999

(51) Int. Cl.[7] ............................................. H04B 7/212
(52) U.S. Cl. ..................... 370/347; 370/349; 375/340; 375/329
(58) Field of Search ................ 370/318, 321, 370/326, 329, 336, 337, 341, 345, 347, 437, 442, 349, 471; 375/269, 273, 274, 279, 305, 303, 329, 152, 323, 324, 325, 340, 343, 283, 286, 287

(56) References Cited

U.S. PATENT DOCUMENTS 6,445,745 B1 * 9/2002 Bontu et al. ................ 375/279

6,463,042 B1 * 10/2002 Paatelma .................... 370/336

* cited by examiner

Primary Examiner—Phirin Sam
(74) Attorney, Agent, or Firm—Harrington & Smith, LLP

(57) ABSTRACT

A method is disclosed for operating a wireless mobile station to receive a time slot sent through a radio channel from a transmitter. In a GPRS embodiment the time slot has a Header portion and a Data portion, wherein the Header portion contains information for specifying whether the Data portion is modulated using 8-PSK modulation or π/4-shifted DQPSK modulation. When modulated using 8-PSK modulation, the Data portion includes a plurality of Pilot symbol sequences at predetermined locations. The method has steps of (a) estimating the quality of the radio channel using symbol sequences found at the predetermined locations, the symbol sequences being assumed to be Pilot symbol sequences; (b) determining a magnitude of a detection error between assumed transmitted Pilot symbol sequences and the detected symbols found at the predetermined locations; (c) calculating a mean of the detection error powers; (d) comparing the calculated mean of the detection error powers with a threshold value; and (e) selecting the modulation type of the Data portion as being one of 8-PSK or π/4-shifted DQPSK based on the result of the step of comparing.

22 Claims, 6 Drawing Sheets

SLOT FORMAT MOBILE STATION TO BASE STATION (ALL NUMBERS INDICATE BITS)

SLOT FORMAT BASE STATION TO MOBILE STATION (ALL NUMBERS INDICATE BITS)

PHASE CONSTELLATION
π/4-SHIFT DQPSK

WIRELESS TELECOMMUNICATION SYSTEM HAVING IMPROVED RECOGNITION OF MODULATION TYPE IN GPRS

FIELD OF THE INVENTION

This invention relates generally to radiotelephones and, in particular, to radiotelephones or mobile stations capable of operation with a digital wireless telecommunications network.

BACKGROUND OF THE INVENTION

FIGS. 1A, 1B and 1C show the frame and time slot formats for an exemplary prior art digital Time Division Multiple Access (TDMA) cellular air interface known in the art as IS-136 (see, for example, IS-136.1, Rev. A, Mar. 21, 1996 and IS-136.2, Rev. A, Feb. 12, 1996, as well as later revisions).

FIG. 1A shows that a 40 millisecond frame consists of six time slots. Slots 1–3 and 4–6 each comprise one TDMA Block. In the forward direction from a base station to a mobile station the frames are continuously transmitted. A given mobile station is assigned to receive in one time slot per frame for a half data rate case, and is assigned to receive in two time slots for a full data rate case. FIG. 1B illustrates the format of one slot in the reverse direction from the mobile station to the base station, while FIG. 1C illustrates the format of one slot in the forward direction from the base station to the mobile station. The base station forms a part of a Base Station/Mobile Switching Center/Interworking function (BMI). Of most interest herein is the forward direction from the base station to the mobile station.

In a conventional implementation of IS-136 the modulation scheme uses a π/4-shifted DQPSK constellation as shown in FIG. 1D, wherein a Gray code is used in the mapping; i.e., two di-bit symbols corresponding to adjacent signal phases differ only in a single bit. In this modulation technique the information is differentially encoded and symbols are transmitted as changes in phase rather than absolute phases.

In an enhanced version of IS-136 (TIA IS-136, Rev. C) a total of four coherently modulated (8PSK) pilot symbol sequences are defined per time slot. Reference in this regard can be had to FIG. 1E, which illustrates a currently proposed slot format. Each pilot symbol sequence consists of three symbols. In this enhanced TDMA system there is a capability for double rate data as well as triple rate data in various combinations, which are useful in transmitting packet data.

More particularly, in a Global Packet Radio System (GPRS) specified for a version of IS-136 of most interest to this invention, and still referring to FIG. 1E, a Header section is 32 symbols in length and a Data portion is 130 symbols in length (a two symbol trailing Ramp portion is not illustrated). The π/4-shifted DQPSK modulation is always used in the Header portion, and either π/4-shifted DQPSK modulation or coherent 8-PSK modulation is used in the Data portion. Before the detection of the received slot can be performed, the receiver must determine which type of modulation is in use in the Data portion of the time slot.

The Header includes 14 synchronization (SYNC) symbols, six Coded Data Field Type (CDFT) symbols, and 12 Packet Channel Feedback (PCF) symbols. The CDFT field contains the following eight bits:

(b2,b1,b0,SFP4,SFP3,SFP2,SFP1,SPF0).

The bit b2 indicates whether incremental redundancy or fixed coding is used in the time slot. The bits b1 and b0 are of most interest to this invention, as they provide an indication the type of modulation that is used in the following Data portion of the time slot. The bits SFP0–SFP4 indicate the superframe phase (0–31). This eight bit word is encoded to 12-bits (six symbols) using a (12,8) code.

When coherent 8-PSK modulation is used, the data portion of the time slot has the following structure:

data(17),pilot(3),data(33),pilot(3),data(33), pilot(3),data (33),pilot(3).

There are thus four data fields and four pilot fields, with the pilot symbols being known symbols used for channel estimation.

When π/4-shifted DQPSK modulation is used instead of 8-PSK modulation, the Data portion of the time slot format includes 128 data symbols. No pilot symbols are used, and in their place can be found random symbols.

A problem occurs in the packet data mode, in particular the GPRS mode specified for IS-136, as the receiving mobile station does not know whether π/4-shifted DQPSK or coherent 8-PSK modulation is used in the Data portion of a received time slot. As was stated above, the correct modulation is intended to be indicated by detecting the two bits b1 and b0 of the six symbol CDFT field found in the Header portion. However, if for any reason the detection of these two bits fails (e.g., due to channel fading, the presence of impulse noise, etc.), then the wrong modulation type can be selected, resulting in the Data portion of the time slot being lost.

It can be appreciated that it would be beneficial to provide a more robust and reliable technique to determine the modulation type of a received time slot in packet data radio telecommunications system, thereby reducing the occurrence of lost time slots and the resulting requirement to retransmit the lost data.

OBJECTS AND ADVANTAGES OF THE INVENTION

It is thus a first object and advantage of this invention to provide a technique to overcome the aforementioned problems by avoiding the necessity to determine a type of modulation used in a received time slot from the bits of the CDFT field in the time slot header.

It is a further object and advantage of this invention to provide a technique for detecting a type of time slot modulation that is in use by employing pilot symbols found in the data portion of the 8-PSK time slot structure.

SUMMARY OF THE INVENTION

The foregoing and other problems are overcome and the objects and advantages are realized by methods and apparatus in accordance with embodiments of this invention.

A method of this invention is disclosed for operating a wireless mobile or user station to receive a time slot sent through a radio channel from a transmitter, the time slot having a first portion and a second portion. The first portion contains information for specifying whether the second portion is modulated using a first modulation type or a second modulation type. When modulated using said second modulation type, said second portion contains a predetermined symbol sequence at a predetermined location. The method has steps of (a) receiving the time slot; (b) operating a demodulator for use with the second type of modulation and determining an amount of detected signal energy, assuming that the predetermined symbol sequence is located at the predetermined symbol sequence location; (c) comparing the power of the detection error to a threshold value to derive a modulation type indication; and (d) based at least in part on the modulation type indication, specifying that the second portion of the received time slot is modulated with the first modulation type or that the second portion is modulated with the second modulation type. The step of operating a demodulator operates a coherent demodulator, preferably a demodulator that operates as an 8-PSK demodulator. The first portion of the time slot containing the information is a CDFT field.

When it is specified that the second portion of the received time slot is modulated with the second modulation type, the method further includes a step of operating a coherent detector to detect the second portion of the time slot.

When it is specified that the second portion of the received time slot is modulated with the second modulation type, the method may contain further steps of operating a second detector to detect the first portion of the time slot containing the information and, using the detected information, verifying that the second portion of the received time slot is modulated with the second modulation type.

The specifying step may further include steps of operating the second detector to detect the first portion of the time slot, which contains the information, to derive a further modulation type indication, combining the modulation type indication and the further modulation type indication and, based on the combined modulation type indications, specifying that said second portion of the received time slot is modulated with the first modulation type or that said second portion is modulated with the second modulation type.

When it is specified that the second portion of the received time slot is modulated with the second modulation type, the method may further include steps of operating the second detector to detect the first portion of the time slot containing the information and, using the detected information, verifying that the second portion of the received time slot is modulated with the second modulation type.

Also disclosed is an algorithm for operating a wireless mobile station to receive a time slot sent through the radio channel from the transmitter. In a GPRS embodiment the time slot has a Header portion and a Data portion, wherein the Header portion contains information for specifying whether the Data portion is modulated using 8-PSK modulation or π/4-shifted DQPSK modulation. When modulated using 8-PSK modulation, the Data portion includes a plurality of Pilot symbol sequences at predetermined locations. The method executed in accordance with the presently preferred algorithm performs steps of: (a) estimating the quality of the radio channel using symbol sequences found at predetermined locations corresponding to the Pilot symbol sequence locations in the Data portion of the time slot; (b) determining a magnitude of a detection error between assumed transmitted Pilot symbol sequences and the detected symbols found at the predetermined locations; (c) calculating a mean of the detection error powers; (d) comparing the calculated mean of the detection error powers with a threshold value; and (e) selecting the modulation type of the Data portion as being one of 8-PSK or π/4-shifted DQPSK based on the result of the step of comparing.

In these embodiments an additional step of varying a magnitude of the threshold value as a function of at least one characteristic of the radio channel can be performed, such as by varying the magnitude of the threshold value as a function of the power of the radio channel noise, as determined from a predetermined symbol sequence (SYNC) that forms a part of the Header portion.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2:
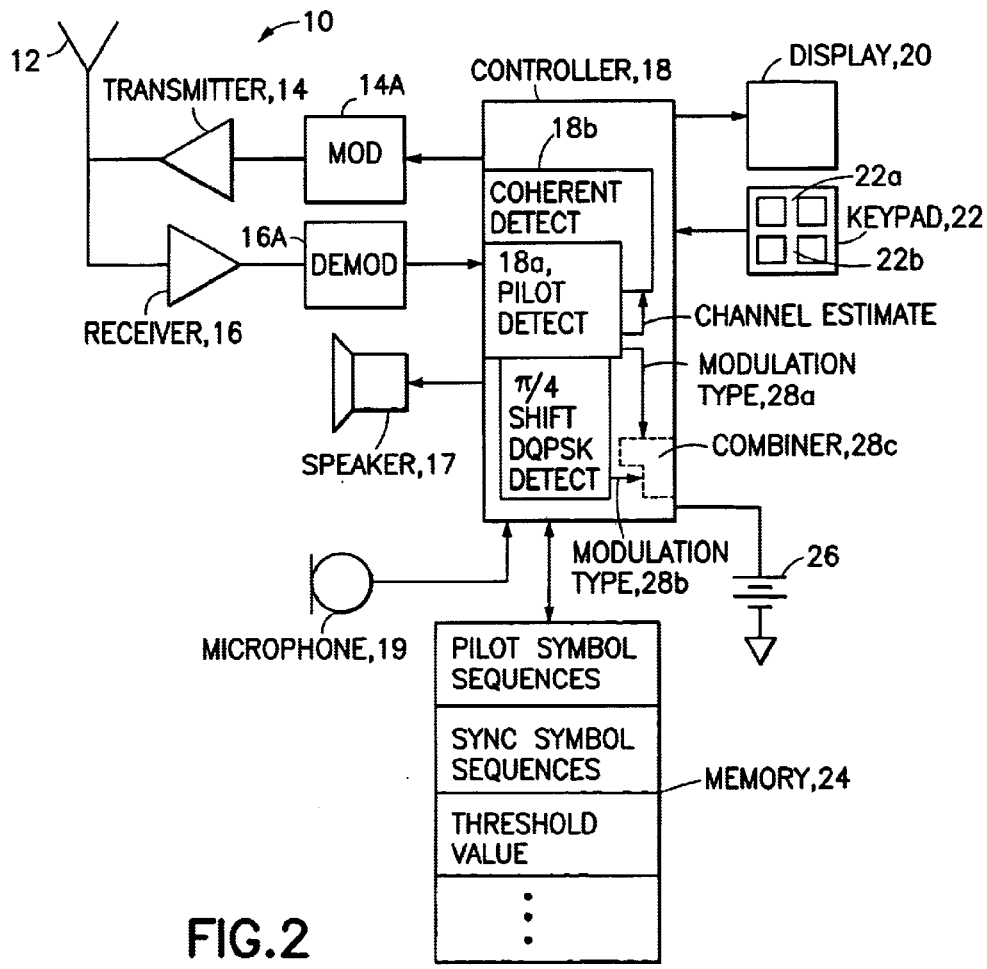
FIG. 2 is a block diagram of a mobile station that is constructed and operated in accordance with this invention.
Figure 3:
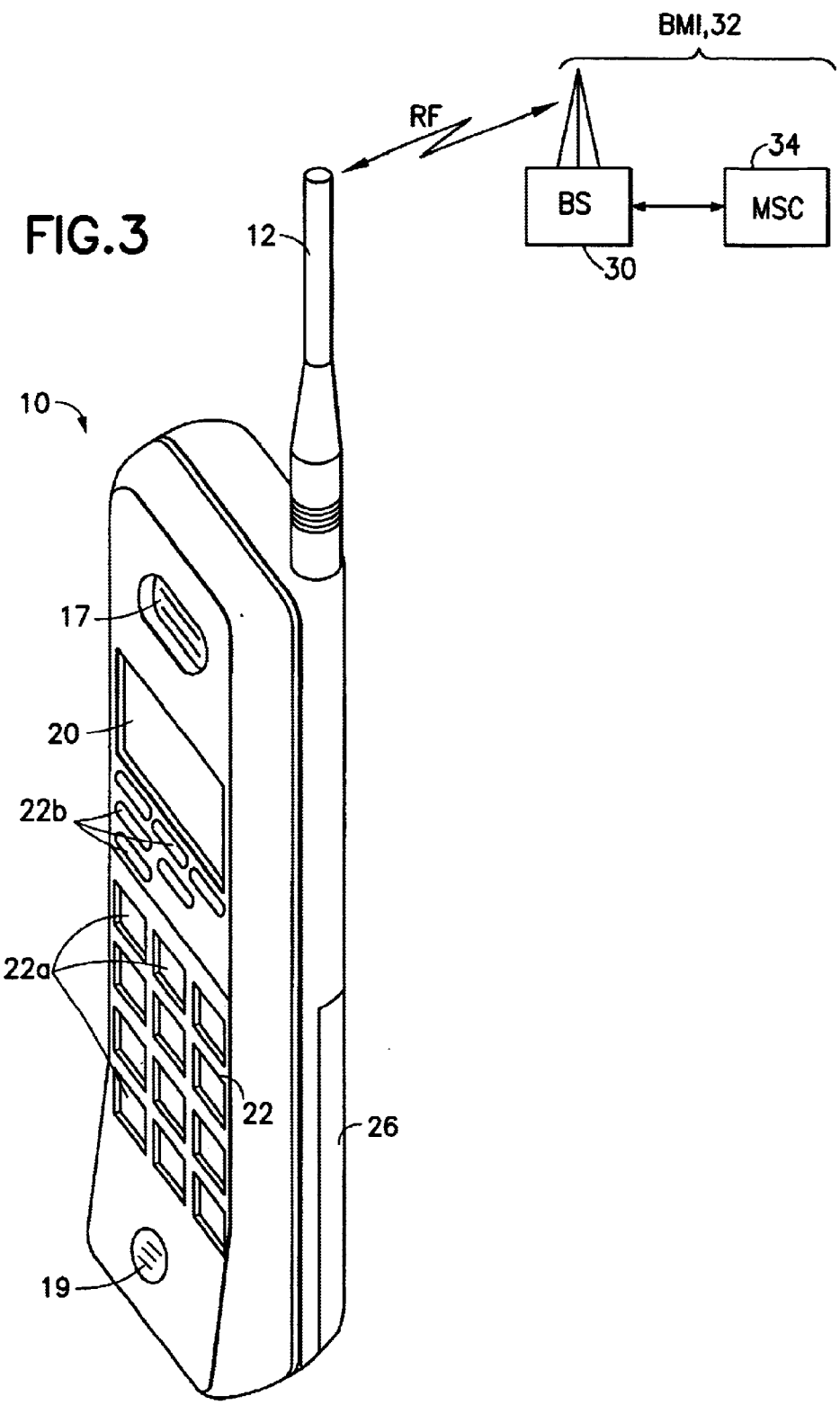
FIG. 3 is an elevational view of the mobile station shown in FIG. 2, and which further illustrates a cellular communication system to which the mobile station is bidirectionally coupled through wireless RF links.

Reference is made to FIGS. 2 and 3 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising the Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also speech and/or data, such as packet data. The air interface standard is assumed for this invention to include a physical and logical frame and time slot structure, preferably the one shown in FIG. 1E for the 8-PSK modulation case. However, other arrangements of time slot fields and numbers of symbols could be used as well.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities. The mobile station 10 also includes a battery 26 for powering the various circuits that are required to operate the mobile station.

A user interface can include a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10.

For the purposes of this description the controller 18 is assumed to contain or implement a coherent (8-PSK) PILOT detector 18a, as described in further detail below, as well as a coherent (8-PSK) detector 18b for detecting the data and other fields of received time slots. The coherent detector 18b normally requires that a channel estimation be performed by the PILOT detector 18a, using the predetermined symbol sequences in the four pilot fields (see FIG. 1E.) Also included is a π/4-shifted DQPSK detector 18c for detecting the Data portion of time slots that are not coherently modulated, as well as the Header portion for all time slots.

As is indicated in FIG. 2, the coherent PILOT detector 18a and the π/4-shifted DQPSK detector 18c generate a modulation type output 28a and 28b, respectively. As will be described below, the Data portion modulation type can be ascertained from only the PILOT detector modulation type indication 28a (a no diversity option), from both of the detector modulation type indications 28a and 28b (with one verifying the other, or by selecting the most reliable (referred to as a selective diversity option), or from a combination of the detector modulation type indications 28a and 28b (a combining diversity option) that is output from an optional combiner 28c.

Figure 1A:
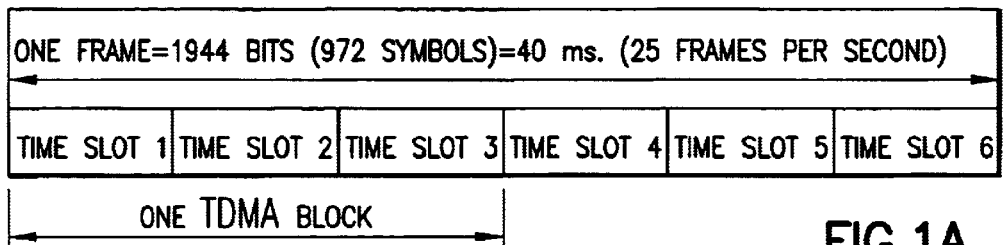
FIGS. 1A, 1B and 1C depict the frame and time slot formats for an exemplary prior art TDMA air interface.
Figure 1B:
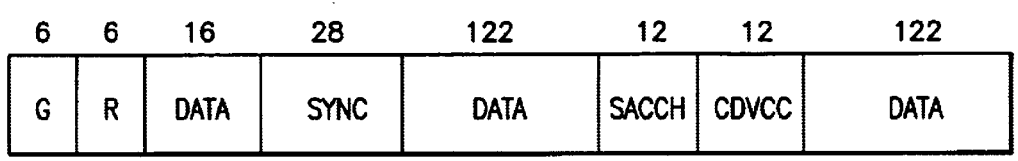
Figure 1C:
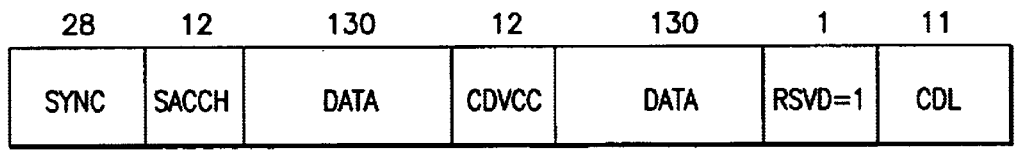
Figure 1D:
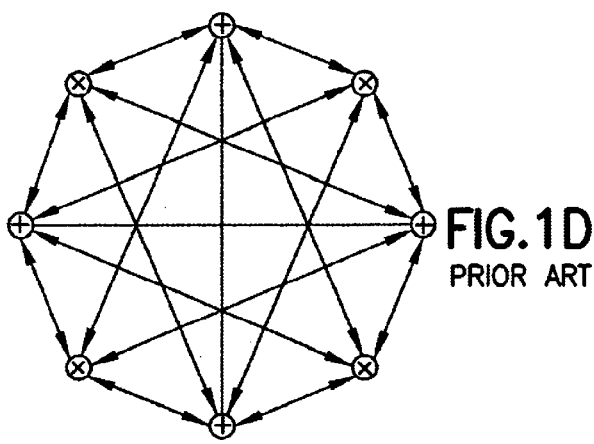
FIG. 1D illustrates the π/4 shifted DQPSK phase constellation used by the exemplary prior art TDMA air interface.
Figure 1E:
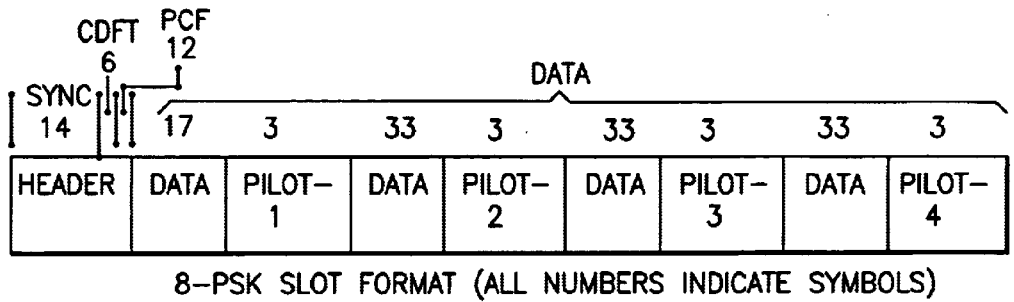
FIG. 1E depicts a forward link slot format for use in a coherently modulated (8-PSK) TDMA air interface.

In operation, and referring also to FIG. 1E, the pilot symbol sequences are detected by the PILOT detector 18a, and an approximate estimation of channel quality is obtained. Since the pilot symbol sequences are known a priori, the PILOT detector 18a is enabled to reconstruct the pilot symbol sequences as transmitted, and thereby estimate the channel quality. The data fields are then detected by the coherent detector 18b, while using the obtained channel estimation. In other embodiments of the invention the operation of detectors 18a and 18b may be performed by a single channel estimator and coherent detector.

The mobile station 10 also includes various memories, shown collectively as the memory 24, wherein are stored a plurality of constants and variables that are used by the controller 18 during the operation of the mobile station 10. For example, data indicating predetermined pilot symbol sequences and predetermined synchronization symbol sequences is stored in the memory 24, as is data indicating a threshold value (preferably adaptive) that is used for comparing with a calculated mean of pilot symbol detection error powers, as will be described in detail below.

It should be understood that the mobile station 10 can be a vehicle mounted or a handheld device. It should further be appreciated that the mobile station 10 can be capable of operating with one or more air interface standards, modulation types, and access types.

Figure 4:
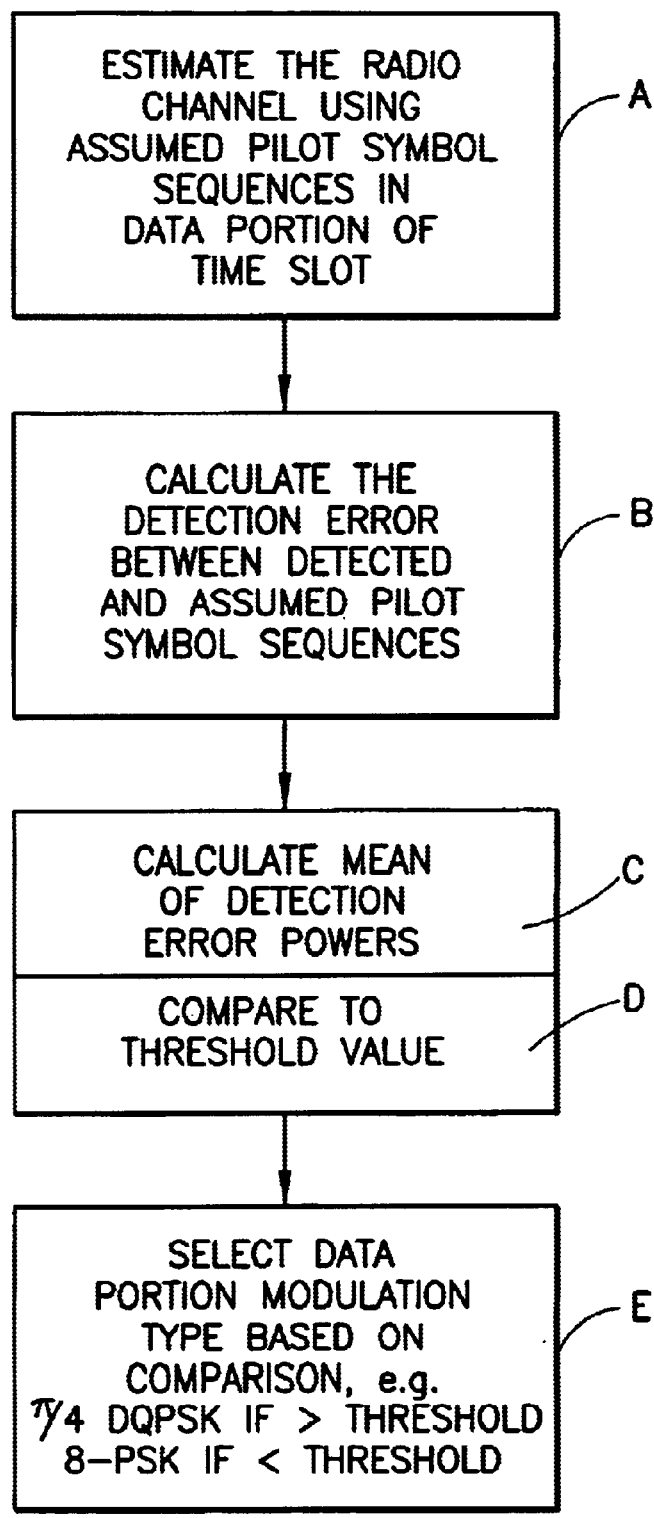
FIG. 4 is a logic flow diagram depicting a preferred time slot Data portion modulation type determination algorithm.

Referring to FIG. 4, a presently preferred modulation-type verification or determination algorithm executes the following steps.

Step A estimates the channel quality using the symbols found in the assumed four pilot field portions of the Data portion. As was indicated above, if the Data portion is 8-PSK modulated, then the symbols found in the four pilot symbol locations will be the actual pilot symbols, while if the Data portion is π/4-shifted DQPSK modulated, then the symbols found in the four pilot symbol locations will be random symbols.

Step B calculates the detection error between the (assumed) transmitted pilot symbols and the detected symbols found at the predetermined pilot symbol locations (see FIG. 1E). If the Data portion was actually transmitted with coherent 8-PSK modulation, then the power of the detection error will be small. However, if the Data portion was actually transmitted with non-coherent π/4-shifted DQPSK modulation, then the power of the detection error is typically large.

Step C then calculates the mean of the detection error powers. For example, the method calculates the mean of the detection error powers of 4×3=12 pilot symbols. While it is within the scope of the teaching of this invention to instead calculate the median value (or some other value) of the detection error powers, the presently preferred embodiment calculates the mean value.

Step D compares the calculated mean of the detection error powers from Step C with a threshold value. In the presently preferred embodiment the threshold value is an adaptive threshold value, as opposed to a fixed threshold value. In the IS-136 GPRS embodiment, and for example, the value of the adaptive threshold may be based on the measured power of the detection error of the above-mentioned predetermined 14 synchronization (SYNC) symbol sequence that is found in the Header portion of the time slot.

Finally, Step E selects the modulation type (8-PSK or π/4-shifted DQPSK) based on the result of the comparison made at Step D. If the power of the detected pilot symbols is larger than the threshold value, then π/4-shifted DQPSK modulation is selected, otherwise 8-PSK modulation is selected.

Figure 5:
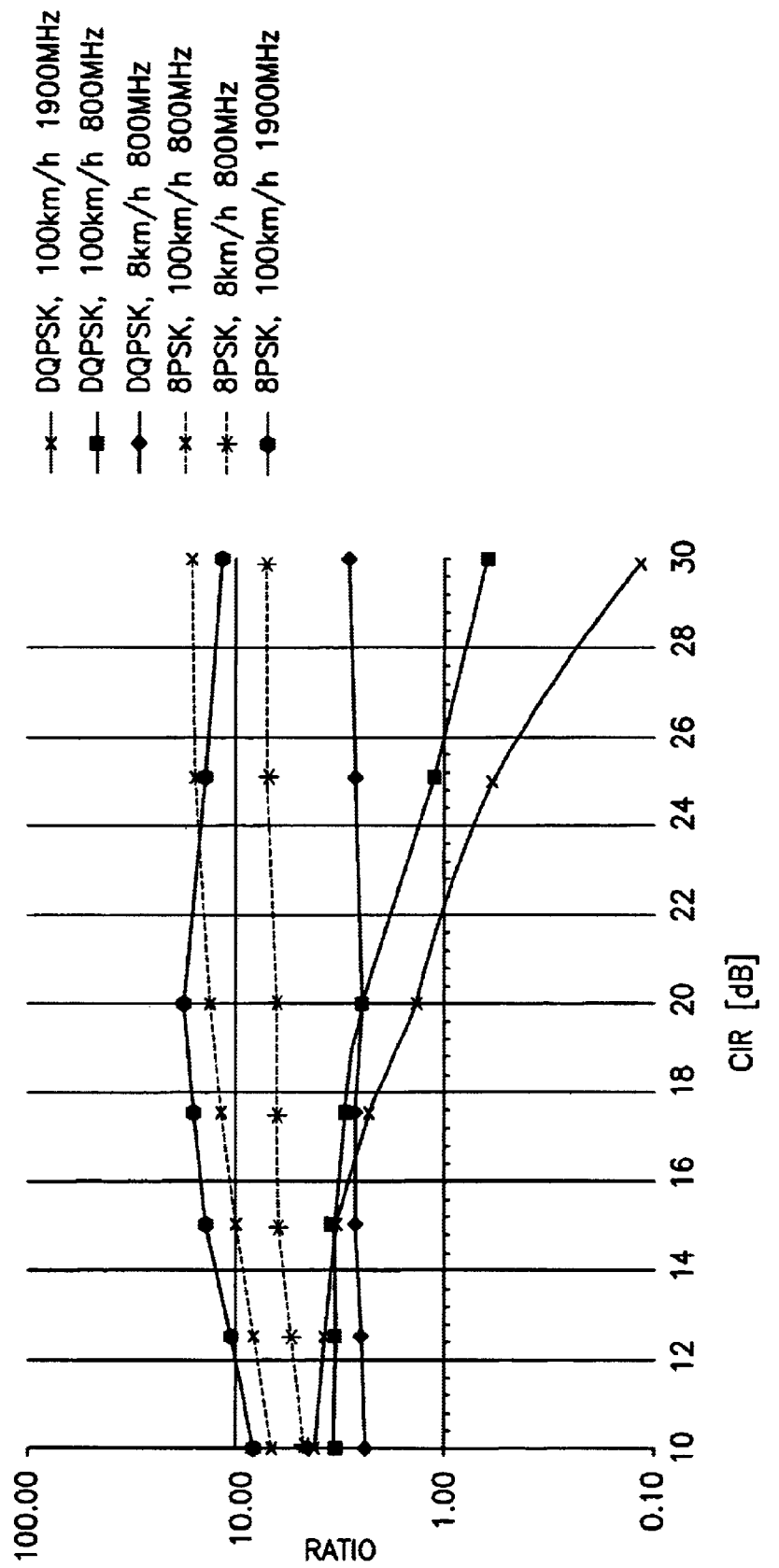
FIG. 5 is a graph that illustrates a relation between Frame Error Rate (FER) caused by decoding errors only, and the FER caused by an erroneous detection of the CDFT bits in the Header portion of the time slot.

Before discussing the algorithm in further detail, it will be instructive to first discuss FIG. 5, which depicts a graph illustrating a relationship between the Frame Error Rate (FER) caused by decoding errors only, and the FER caused by an erroneous detection of the CDFT bits in the Header portion of the time slot. In the graph of FIG. 5 the abscissa represents a Carrier Interference Ratio (CIR), and the various curves are given for different mobile station velocities (in kilometers/hour) in the 800 MHz and 1900 MHz frequency bands. In general, the higher the velocity the greater is the Doppler frequency shift of the received carrier.

It can be appreciated from FIG. 5 that the recognition of the modulation type based solely on the CDFT bits is very unreliable, and is potentially a major source of frame errors under certain channel conditions. It can also be appreciated that the total FER can be reduced to about 10% of the FER achieved using only the detection (π/4-shifted DQPSK detection) of the CDFT bits b0, b1 in the Header portion. This is true a high speeds, and at large CIRs. At moderate CIRs and high speeds, a reduction in FER by about 40% to 50% can be achieved if the correct modulation type can be detected more reliably.

Figure 6:
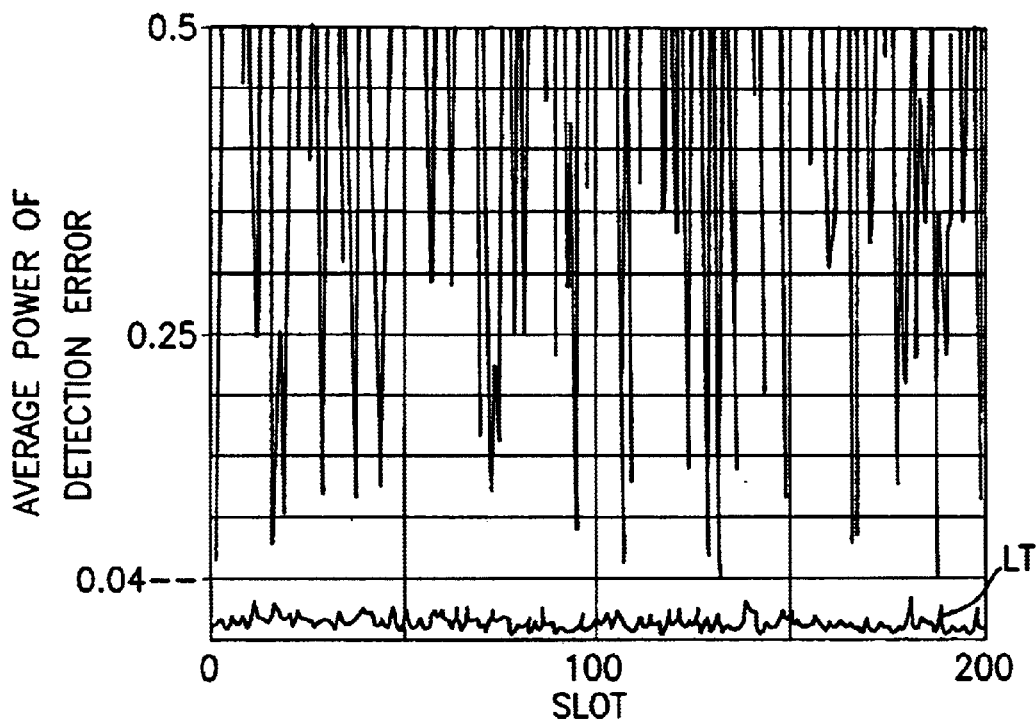
FIGS. 6 and 7 graphically present the performance of the modulation type detection technique of this disclosure for a simulated flat Rayleigh fading channel with a fading rate fd=184 Hz (FIG. 6), and also at a slower speed fading rate of fd=10 Hz (FIG. 7).
Figure 7:
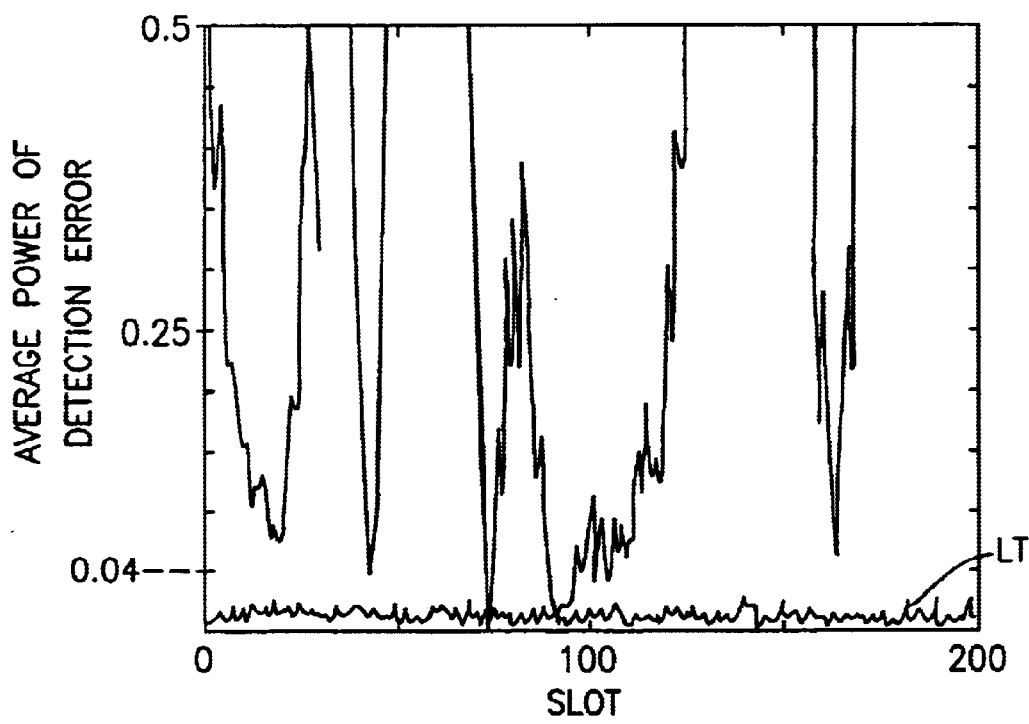

The performance of the improved modulation type detection technique in accordance with this disclosure was simulated in a flat Rayleigh fading channel with a fading rate fd=184 Hz (see FIG. 6), and also at a slower speed fading rate of 10 Hz (see FIG. 7). The signal-to-noise ratio (SNR) per symbol in both cases was Es/No=17 dB.

In FIGS. 6 and 7 the lower trace (LT) indicates an average power of the pilot symbol detection error when 8-PSK modulation is used in the Data portion of the time slot, while the upper trace indicates the average power of the pilot symbol detection error when π/4-shifted DQPSK modulation is used in the Data portion of the time slot.

By example, a representative threshold value could be about 0.04 in both FIGS. 6 and 7. As was indicated above, it is preferred that the threshold value be made adaptive and varied as a function of at least one characteristic of the radio channel. For example, the magnitude of the threshold value can be set according to the power of the channel noise (e.g., threshold=2*channel_noise_power). The power of the channel noise can be determined from the above-mentioned predetermined 14 symbol synchronization (SYNC) sequence that is found in the Header portion of the time slot.

FIG. 5 shows that the modulation type verification algorithm performs properly at high Doppler rates (high speeds). Assuming that the threshold value is set correctly, the correct modulation type is determined and selected.

At least three different embodiments of the teachings of this invention can be employed to improve the detection of the modulation of the Data portion of the time slot.

A first embodiment is referred to as a "No Diversity" option, wherein the modulation type is recognized using only the pilot symbols in the Data portion. In this embodiment the detection of the CDFT bits is not used.

A second embodiment is referred to as a "Selective Diversity" option, wherein the reliability of the modulation type detection using the CDFT bits from the Header portion is determined from the detection error. In this case, if the determination of the modulation type bits in the Header portion is unreliable, then the modulation type is verified using the pilot symbols in the Data portion, as described above. Conversely, if detection of the modulation type based on the pilot symbols in the Data portion is unreliable, then the modulation type is verified using the CDFT bits in the Header portion. As another alternative, the modulation type is detected based on the pilot symbols in the Data portion, as well as from the CDFT bits in the Header portion, and the most reliable decision is selected.

A third embodiment is referred to as a "Combining Diversity" option, wherein the modulation type is detected based on the pilot symbols in the Data portion, as described above, as well as from the CDFT bits in the Header portion, and the two detection results are then combined in combiner 28c to yield an indication of the modulation type.

Although described in the context of preferred embodiments, it should be realized that a number of modifications to these teachings may occur to those skilled in the art. By example, various other types of coherent and differential modulation techniques may be employed other than those specifically referred to above, as can other time slot formats, other numbers of symbols in particular time slot fields, more or less than four pilot symbol sequences, and so forth. It should thus be clear that the teachings of this invention are not limited for use with any particular air interface standard or protocol, such as IS-136.

Furthermore, and while described above in the context of a wireless telecommunications system that employs π/4-shifted DQPSK modulation, in other embodiments other modulation types could be used, such as Differential Quadrature Phase Shift Keying (DQPSK), Differential 8 Phase Shift Keying (D8PSK), or 16-DQPSK. The foregoing teachings are also not limited to only the use of 8-PSK modulation, as other coherent modulation types can be employed as well.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises at least one predetermined symbol sequence at a predetermined location, comprising steps of:

receiving the time slot;

operating a demodulator for use with the second type of modulation and determining an amount of detected signal energy, assuming the predetermined symbol sequence being located at the predetermined symbol sequence location;

comparing the power of a detection error to a threshold value to derive a modulation type indication; and based at least in part on the modulation type indication, specifying that said second portion of the received time slot is modulated with the first modulation type or that said second portion is modulated with the second modulation type.

2. A method as in claim 1, wherein the step of operating a demodulator operates a coherent demodulator.

3. A method as in claim 1, wherein the step of operating a demodulator operates an 8-PSK demodulator.

4. A method as in claim 1, wherein the first portion of the time slot containing said information comprises a Coded Data Field Type (CDFT) field.

5. A method as in claim 1, wherein when it is specified that said second portion of the received time slot is modulated with the second modulation type, further comprising a step of operating a coherent detector to detect the second portion of the time slot.

6. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises at least one predetermined symbol sequence at a predetermined location, comprising steps of:

receiving the time slot;

operating a demodulator for use with the second type of modulation and determining an amount of detected signal energy, assuming the predetermined symbol sequence being located at the predetermined symbol sequence location;

comparing the power of a detection error to a threshold value to derive a modulation type indication; and based at least in part on the modulation type indication, specifying that said second portion of the received time slot is modulated with the first modulation type or that said second portion is modulated with the second modulation type, wherein when it is specified that said second portion of the received time slot is modulated with the second modulation type, further operating a second detector to detect the first portion of the time slot containing the information, and using the detected information for verifying that the second portion of the received time slot is modulated with the second modulation type.

7. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises at least one predetermined symbol sequence at a predetermined location, comprising steps of:

receiving the time slot;

operating a demodulator for use with the second type of modulation and determining an amount of detected signal energy, assuming the predetermined symbol sequence being located at the predetermined symbol sequence location;

comparing the power of a detection error to a threshold value to derive a modulation type indication; and based at least in part on the modulation type indication, specifying that said second portion of the received time slot is modulated with the first modulation type or that said second portion is modulated with the second modulation type; wherein specifying further comprises operating a second detector to detect the first portion of the time slot containing the information to derive a further modulation type indication, combining the modulation type indication and the further modulation type indication and, based on the combined modulation type indications, specifying that said second portion of the received time slot is modulated with the first modulation type or that said second portion is modulated with the second modulation type.

8. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises at least one predetermined symbol sequence at a predetermined location, comprising steps of:

receiving the time slot;

operating a demodulator for use with the second type of modulation and determining an amount of detected signal energy, assuming the predetermined symbol sequence being located at the predetermined symbol sequence location;

comparing the power of a detection error to a threshold value to derive a modulation type indication; and based at least in part on the modulation type indication, specific that said second portion of the received time slot is modulated with the first modulation type or that said second portion is modulated with the second modulation type, wherein when it is specified that said second portion of the received time slot is modulated with the second modulation type, further operating a second detector to detect the first portion of the time slot containing the information, and using the detected information to verify that the second portion of the received time slot is modulated with the second modulation type.

9. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises a predetermined symbol sequence at a predetermined location, comprising steps of:

receiving the time slot;

operating a first detector using first modulation type detection to detect the first portion of the time slot containing the information to derive a first modulation type indication;

operating a second detector using second modulation type detection to detect the predetermined symbol sequence at the predetermined location to derive a second modulation type indication; and based on both the first modulation type indication and the second modulation type indication, specifying that said second portion of the received time slot is modulated with the first modulation type or that said second portion is modulated with the second modulation type.

10. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises a predetermined symbol sequence at a predetermined location, comprising steps of:

receiving the time slot;

operating a first detector using first modulation type detection to detect the first portion of the time slot containing the information to derive a first modulation type indication;

operating a second detector using second modulation type detection to detect the predetermined symbol sequence at the predetermined location to derive a second modulation type indication; and based on a combination of the first modulation type indication and the second modulation type indication, specifying that said second portion of the received time slot is modulated with the first modulation type or that said second portion is modulated with the second modulation type.

11. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises a predetermined symbol sequence at a predetermined location, comprising steps of:

receiving the time slot;

operating a first detector using first modulation type detection to detect the first portion of the time slot containing the information to derive a first modulation type indication;

operating a second detector using second modulation type detection to detect the predetermined symbol sequence at the predetermined location to derive a second modulation type indication; and based on a more reliable one of the first modulation type indication or the second modulation type indication, specifying that said second portion of the received time slot is modulated with the first modulation type or that said second portion is modulated with the second modulation type.

12. A method for operating a wireless mobile station to receive a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises a predetermined symbol sequence at a predetermined location, comprising steps of:

receiving the time slot;

operating a first detector using first modulation type detection to detect the first portion of the time slot containing the information to derive a first modulation type indication;

operating a second detector using second modulation type detection to detect the predetermined symbol sequence at the predetermined location to derive a second modulation type indication; and if either one of the modulation type indications is deemed to be unreliable, using the other modulation type indication as well for specifying that said second portion of the received time slot is modulated with the first modulation type or that said second portion is modulated with the second modulation type.

13. A receiver unit for use in a digital wireless communication system, comprising:

a receiver for receiving a time slot sent through a radio channel from a transmitter, the time slot having a first portion and a second portion, said first portion containing information for specifying whether said second portion is modulated using a first modulation type or a second modulation type, wherein when modulated using said second modulation type said second portion comprises a predetermined symbol sequence at a predetermined location;

a first detector using first modulation type detection for detecting the first portion of the time slot containing the information to derive a first modulation type indication;

a second detector using second modulation type detection for detecting an assumed predetermined symbol sequence at the predetermined location to derive a second modulation type indication; and a processor, responsive to at least one of the first modulation type indication and the second modulation type indication, for specifying that said second portion of the received time slot is modulated with the first modulation type or that said second portion is modulated with the second modulation type.

14. A receiver unit as in claim 13, wherein the predetermined symbol sequence is coherently modulated.

15. A receiver unit as in claim 13, wherein the predetermined symbol sequence is modulated with 8-PSK modulation.

16. A receiver unit as in claim 13, wherein the first portion of the time slot containing said information is modulated with π/4-shifted DQPSK modulation.

17. A receiver unit as in claim 13, wherein the first portion of the time slot containing said information comprises a CDFT field.

18. A receiver unit as in claim 13, and further comprising a combiner for combining the first modulation type indication and the second modulation type indication, and wherein said processor, based on the combined modulation type indications, specifies that said second portion of the received time slot is modulated with the first modulation type or that said second portion is modulated with the second modulation type.

19. A receiver unit as in claim 13, wherein said receiver unit is located within a mobile station.

20. A method for operating a wireless mobile station to receive a time slot sent through a radio channel from a transmitter, the time slot having a Header portion and a Data portion, wherein the Header portion contains information for specifying whether the Data portion is modulated using 8-PSK modulation or π/4-shifted DQPSK modulation, wherein when modulated using 8-PSK modulation the Data portion comprises a plurality of Pilot symbol sequences at predetermined locations, comprising steps of:

estimating the quality of the radio channel using symbol sequences found at the predetermined locations, the symbol sequences being assumed to be Pilot symbol sequences;

determining a magnitude of a detection error between assumed transmitted Pilot symbol sequences and the detected symbols found at the predetermined locations;

calculating a mean of the detection error powers;

comparing the calculated mean of the detection error powers with a threshold value; and selecting the modulation type of the Data portion as being one of 8-PSK or π/4-shifted DQPSK based on the result of the step of comparing.

21. A method as in claim 20, and further comprising a step of varying a magnitude of the threshold value as a function of at least one characteristic of the radio channel.

22. A method as in claim 20, and further comprising a step of varying a magnitude of the threshold value as a function of the power of the radio channel noise, as determined from a predetermined symbol sequence that comprises part of the Header portion.

* * * * *